(12) United States Patent
Uesugi et al.

(10) Patent No.: US 6,347,391 B1
(45) Date of Patent: Feb. 12, 2002

(54) RADIO COMMUNICATION APPARATUS

(75) Inventors: Mitsuru Uesugi; Osamu Kato, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/079,379

(22) Filed: May 15, 1998

(30) Foreign Application Priority Data

May 20, 1997 (JP) .............................................. 9-147232

(51) Int. Cl.[7] .............................................. G06F 11/10
(52) U.S. Cl. ........................ 714/795; 329/372; 714/794; 455/73; 375/329
(58) Field of Search ........................ 714/746, 756–757, 714/795, 786; 329/318, 372; 375/344, 232, 340, 134, 349, 347, 348, 330, 295, 316; 455/192.2, 550, 73, 403, 422; 333/18; 708/323; 700/2; 380/270; 348/554, 555

(56) References Cited

U.S. PATENT DOCUMENTS

| | | | | |
|---|---|---|---|---|
| 4,429,334 A | * | 1/1984 | Hashimoto et al. ........... | 386/13 |
| 5,353,307 A | | 10/1994 | Lester et al. ................. | 375/233 |
| 5,511,096 A | * | 4/1996 | Huang et al. ................. | 375/265 |
| 5,648,986 A | * | 7/1997 | Tatsumi et al. .............. | 375/229 |
| 5,673,291 A | * | 9/1997 | Dent ........................... | 375/262 |
| 5,710,784 A | * | 1/1998 | Kindred et al. .............. | 375/262 |
| 5,881,106 A | * | 3/1999 | Cartier ........................ | 375/262 |
| 5,889,823 A | * | 3/1999 | Agazzi et al. ............... | 375/341 |
| 5,917,863 A | * | 6/1999 | Soichi et al. ................ | 375/341 |
| 5,923,761 A | * | 7/1999 | Lodenius ..................... | 380/49 |
| 6,128,328 A | * | 10/2000 | Schilling ..................... | 375/134 |

FOREIGN PATENT DOCUMENTS

| | | | | |
|---|---|---|---|---|
| JP | 5183537 | 7/1993 | ............. | H04L/1/00 |
| JP | 7123462 | 5/1995 | ............. | H04Q/7/28 |

OTHER PUBLICATIONS

Aue et al. (An Interference Robust CDMA Demodulator that uses Spectral Correlation Properties, IEEE, Jun. 1994).*

Bolla et al. (Implementation of a 64–QAM Modem for 140 Mbits Digital Signal Radio, IEEE, Jun. 1991).*

Tellado–Mourelo et al.(Adaptive DFE for GMSK in Indoor Radio Channels. IEEE, Apr. 1996).*

Sadri et al.(Equalization, Coding, and Diversity Combining for TDMA Digital Cellular Systems. IEEE, Jul. 1995).*

Cook, S.C.; Gill, M.C.; Giles, T.C., "A high–speed HF parallel–tone modem", HF Radio Systems and Techniques, 1994., Sixth Inetrnational Conference on, 1994, pp. 175–181.*

Smee, J.E.; Beaulieu, N.C., "On the equivalence of the Simultaneous and seperate MMSE optimizations of a DFE FFF and FBF", Communications, IEEE Transactions on, vol. 45, pp. 156–158, Feb. 1997.*

An English Language abstract of JP 7–123462.

An English Language abstract of JP 5–183537.

Article entitled "Simulation and Performance of the Pan–European Land Mobile Radio System," by D'Aria et al., IEEE Transactions on Vehicular Technology, New York, May 1, 1992, vol. 41, No. 2, pp. 177–189.

Article entitled "Joint Antenna Diversity and Combined Soft Output MAP Equalization/Decoding of TCM on Frequency–Selective Fading Mobile Radio Channels" by Femenias et al., IEEE, Gateway to 21st Century Conference, Tokyo, Japan, Nov. 6–10, 1995, IEEE vol. 4, conference 4, pp. 914–918, New York.

* cited by examiner

*Primary Examiner*—Albert Decady
*Assistant Examiner*—Guy Lamarre
(74) *Attorney, Agent, or Firm*—Greenblum & Bernstein, P.L.C.

(57) ABSTRACT

A signal received by a receiving antenna is input to an UDMV through a detector, and compensation for distortion caused by multipath fading and an error correction using Viterbi decoding are simultaneously performed, obtaining demodulation data. The UDMV comprises a demodulator in which an MLSE and a Viterbi decoder are combined. Thereby, equalization for removing a line distortion and reduction in an error rate can be simultaneously performed, improving a receiving quality.

19 Claims, 13 Drawing Sheets

BLOCK OF RECEIVING SYSTEM

FIG. 10

| 604 | A(0,0) | A(0,1) | A(0,2) | A(0,3) | A(0,4) | A(0,5) | SLOT#0 |
| 605 | B(0,1) | B(0,2) | B(0,3) | B(0,4) | B(0,5) | B(0,6) | SLOT#1 |
| 606 | A(1,0) | A(1,1) | A(1,2) | A(1,3) | A(1,4) | A(1,5) | SLOT#2 |
| 607 | B(1,1) | B(1,2) | B(1,3) | B(1,4) | B(1,5) | B(1,6) | SLOT#3 |

FIG. 11

| 700 f1 | 1 | 2 | 4 | 3 | 1 | 4 | 2 | 1 | 3 | 4 |
| 701 f2 | 2 | 1 | 2 | 4 | 2 | 3 | 4 | 2 | 4 | 1 |
| 702 f3 | 3 | 4 | 3 | 1 | 3 | 1 | 3 | 4 | 1 | 2 |
| 703 f4 | 4 | 3 | 1 | 2 | 4 | 2 | 1 | 3 | 2 | 3 |

FIG. 14

SELECTION LOGIC BY SELECTION AND DETERMINATION UNIT 910 AND SELECTOR 911

| RESULT OF CRC UNIT A 907 | RESULT OF CRC UNIT B 908 | DATA TO BE SELECTED |
|---|---|---|
| OK | OK | OUTPUT OF EQUALIZER A904 (OUTPUT OF EQUALIZER B905 IS POSSIBLE) |
| OK | NG | OUTPUT OF EQUALIZER 904 |
| NG | OK | OUTPUT OF EQUALIZER 905 |
| NG | NG | OUTPUT OF UDMY 906 |

FIG. 15

| 805 | A(0,0) | A(0,1) | A(0,2) | A(0,3) | A(0,4) | A(0,5) | SLOT#0 |
| 806 | B(0,1) | B(0,2) | B(0,3) | B(0,4) | B(0,5) | B(0,6) | SLOT#1 |
| 807 | A(1,0) | A(1,1) | A(1,2) | A(1,3) | A(1,4) | A(1,5) | SLOT#2 |
| 808 | B(1,1) | B(1,2) | B(1,3) | B(1,4) | B(1,5) | B(1,6) | SLOT#3 |

RADIO COMMUNICATION APPARATUS

BACKGROUND OF THE INVENTION

1. Field of the Invention

The present invention relates to a radio communication apparatus such as a receiver for compensating for distortion caused by multipath fading and correcting an error correction and a transmitter for transmission data to the receiver.

2. Description of the Related Art

In the field of the radio communication, it is indispensable for overcoming the problem of multipath fading and improving transmission quality. It is known that equalizers are useful for overcoming the problem of multipath fading. In order to improve transmission quality, there is used a method in which an error correction code, particularly a convolutional code is decoded by a Viterbi decoder for a soft decision.

A conventional data transmitter comprises an equalizer for compensating for distortion caused by multipath fading and a Viterbi decoder for an error correction in a receiving system, and the equalizer and the Viterbi decoder are independently operated.

FIG. 1 is a structural showing the conventional data transmitter in which the equalizer and the Viterbi decoder are independently operated. On the transmitter side, transmission data 1 is encoded by a convolution encoder 2, modulated by a modulator 3, and transmitted from a transmission antenna 4. On the receiver side, a received signal received by a receiving antenna 5 is sent to an equalizer 6, and an output of the equalizer 6 is decoded by a Viterbi decoder 7 so as to obtain decoded data 8. The equalizer 6 compensates for distortion caused by multipath fading occurring on a line, and an MLSE (Maximum Likelihood Sequence Estimator) or a DFE (Decision Feedback Equalizer) are used as such an equalizer. In particular, MLSE is known as an apparatus, which can realize substantially an optimum characteristic even in a mobile radio channel whose fading varies drastically The following will explain the principle of the MLSE-typed equalizer 6 using a line model shown in FIG. 2.

The line model of FIG. 2 is a model of the multipath fading with paths of (N+1) waves. In this line model, a transmission signal 100 is delayed by delay units 101-0 to 101-N, and is subjected to fading variation by relay fading adding units 102-0 to 102-N. Then, attenuators 103-0 to 103-N attenuate the signal subjected to the fading variation, and the attenuated resultant is added by a complex adder 104 so as to obtain a received signal 105.

The delay units 101-0 to 101-N show the delay caused by various lengths of paths, and the relay fading adding units 102-0 to 102-N show the relay fading, which is independently provided to the respective paths. The transmission signal 100 is subjected to a random phase variation and a level variation in accordance with a relay distribution by these delay units and the relay fading adding units.

The attenuators 103-0 to 103-N show attenuation, which is independently provided to the respective paths. In a base band, the transmitting and receiving signals comprise a quadrature component and an in-phase component, which are respectively a real part and an imaginary part, and they are considered as complex numbers, and each section of FIG. 2 is a complex number. In other words, a model in which the signals are finally combined at the receiving antenna terminal is also used as a complex adder 104.

FIG. 3 shows a case in which the line model shown in FIG. 2 is rewritten as a model, which is close to a digital filter. A transmission signal 200 is delayed by delay units 202-0 to 201-(N−1), complex gains are added thereto by complex gain adding units 202-0 to 202-N, and combined by a complex adder 203 so as to obtain a received signal 204. The complex gain adding units 202-0 to 202-N are those in which the variations of the relay fading adding units 102-0 to 102-N and those of attenuators 103-0 to 103-N are combined.

The MLSE estimates the complex gain adding units 202-0 to 202-N using an unique word inserted to data. If the complex gain adding units 202-0 to 202-N are obtained, the line model can be reproduced. Therefore, in a state in which past transmission data 200 is stored by delay units 201-0 to 201-(N−1), a replica is generated using the filter of FIG. 3 and a transmitting sequence is estimated by Viterbi decoding.

However, there is a case in which the error rate can be reduced to only a certain degree in the MLSE. Due to this, an error correction code is used in conjunction with the MLSE. The convolution encoder 2 produces a plurality of bits in accordance with the state of the past several bits every time when one bit of transmission data 1 is input. For example, if an encoding rate is 1/2, two bits are produced every time one bit of transmission data 1 is input. This state is shown in FIG. 4. Transmission data 300 is delayed by delay units 301-0 to 301-(M−1), complex gains are added thereto by complex gain adding units 302-0 to 302-(M), and its exclusive-OR is obtained by an exclusive-OR circuit 303, generating a transmission signal 304. The past transmission data 300 is accumulated by the delay units 301-0 to 301-(M−1), and this is the state at the time of decoding by Viterbi decode. In the case of the convolution encoder, the encoder is unchanged. Moreover, the complex gain adding units 302-0 to 302-M actually obtain only any one of values of 0,1,j, 1+j since only a bit calculation is performed. In this case, since the structure of the encoder of FIG. 4 is shown in advance, in the Viterbi decoder 7 on the receiving side, data can be decoded by the Viterbi decoding.

Thus, in the conventional data transmitter, the equalizer such as MLSE compensates for the distortion of the multipath fading, and uncompensated errors are corrected by the error correction codes such the convolution encoding, Viterbi decoding, thereby realizing the data transmission with a good quality.

However, in the conventional data transmitter, the compensation for the line distortion using the equalizer and the error correction using the Viterbi decoder were independently performed. As a result, constraint conditions of the respective sequences were independent of each other. Among paths for Viterbi decoding, there was a case in which the path, which was impossible to be used as a candidate, was included, depending on the line condition. This resulted in the deterioration of improving effect of the error rate.

SUMMARY OF THE INVENTION

An object of the present invention is to provide a radio communication apparatus wherein equalization for removing a line distortion caused by multipath fading and an error correction for reducing an error rate are simultaneously performed so as to improve a receiving quality, and two steps, i.e., the equalization and the error correction are performed at one time so as to improve reduction in the number of times of trace back and a memory capacity.

According to the present invention, there is estimated an imaginary encoder in which a line model and a convolutional encoder are combined, thereby performing Viterbi decoding thereby, and the above-mentioned object can be attained by the radio communication apparatus, which can simultaneously perform equalization using an MLSE and Viterbi decoding of a convolutional code. Thereby, an error rate characteristic can be improved.

BRIEF DESCRIPTION OF THE DRAWINGS

FIG. 10 is a view showing slots to which interleaving is provided in the second embodiment of the present invention;

FIG. 11 is a view showing a frequency hopping in a data transmitter of a third embodiment of the present invention;

FIG. 14 is a structural view showing a selection logic table in the receiving system of the fourth embodiment of the present invention; and FIG. 15 is a view showing slots to which interleaving is provided in the fourth embodiment of the present invention.

DETAILED DESCRIPTION OF THE PREFERRED EMBODIMENTS

Figure 1:
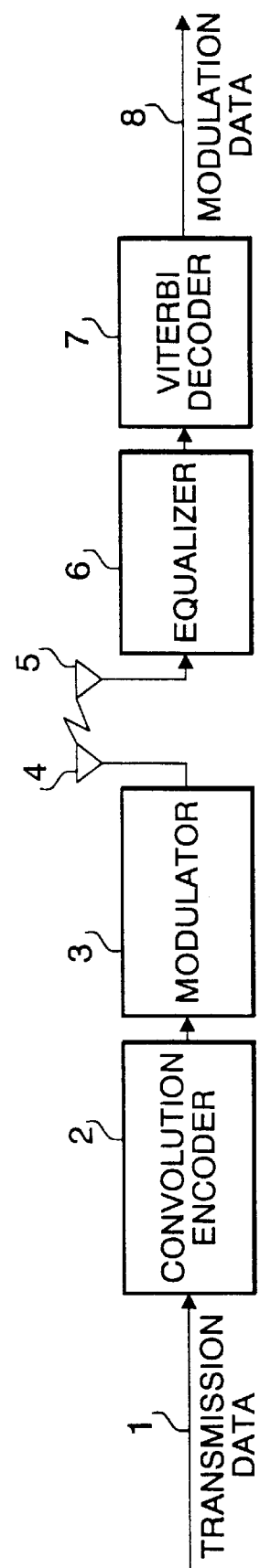
FIG. 1 is a diagrammatic view of a conventional data transmitter.
Figure 2:
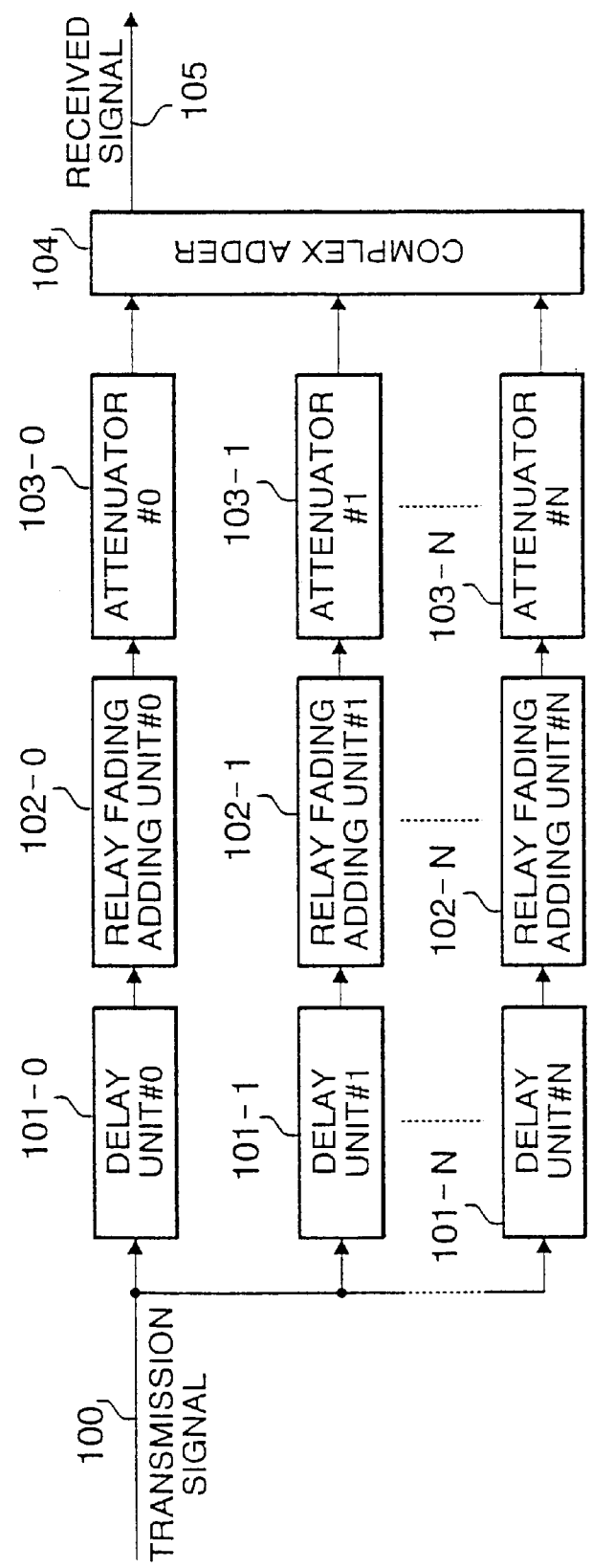
FIG. 2 is a view showing a line model.

According to a first embodiment of the present invention, there is provided a radio communication apparatus comprising a receiving system wherein equalization for compensating for distortion caused by multipath fading and an error correction for decoding data error-correction encoded are simultaneously performed. Thereby, the error ratio characteristic and reduction in the number of times of trace back and a memory capacity can be improved. It is preferable that the radio communication apparatus comprises a demodulator in which an equalizer and an error corrector are combined, compensation for distortion caused by multipath fading and the error correction are simultaneously performed. This can improve receiving quality. In this case, the demodulator preferably comprises an imaginary encoder in which a multipath leading to an antenna of the receiving system from an encoder on a transmitting side is imaginarily structured by a digital filter. Thereby, the compensation for distortion caused by multipath fading and the error correction can be simultaneously performed. Moreover, the demodulator preferably comprises a part for setting a state in which an encoder on a transmitting side and a line distortion are combined to the imaginary encoder, and a part for sending a candidate signal to the imaginary encoder, while estimating a transmission data sequence from an error signal between a replica output from the imaginary encoder and a received signal. Thereby, equalization using the MLSE and Viterbi decoding to the convolutional code can be performed simultaneously.

In the first embodiment, the radio communication apparatus preferably further comprises a demodulator for performing equalization for compensating for distortion caused by multipath fading and an error correction for decoding data error-correction encoded simultaneously, a plurality of equalizers for equalizing a receiving data for each transmission sequence, CRC (Cyclic Redundancy Checking) means for cyclic redundancy checking demodulation data decoded by the equalizers for each transmission sequence, and selecting means for selecting the demodulation data of the demodulator when the demodulation data of each equalizer is an error from the result of the CRC. Thereby, a data frame in which no error is determined is used, and the result of the modulator is employed only when all data frames are errors. As a result, a frame error rate characteristic of data frame can be improved.

A second embodiment of the present invention provides a radio communication apparatus wherein modulation data to which interleave with a depth corresponding to the reciprocal of an encoding rate received as maintaining a sequence order on the transmitting side, and equalization for compensating for distortion caused by multipath fading and an error correction are simultaneously performed with respect to the modulation data corresponding to a plurality of transmitting sequences generated when encoding transmission data, thereby correctly demodulating interleaved transmission data.

A third embodiment of the present invention provides a radio communication apparatus wherein modulation data, which is frequency hopped between a plurality of frequencies on a transmitting, is received and equalization for compensating for distortion caused by multipath fading and an error correction are simultaneously performed with respect to modulation data extracted from a specific transmitter in synchronism with a frequency hopping operation. Thereby, the error rate characteristic can be improved even at a low speed fading time.

According to the present invention, there can be provided a radio communication apparatus on the transmitting side for transmitting transmission data, to which interleave with a depth corresponding to the reciprocal of an encoding rate is provided as maintaining a sequence order, to radio communication apparatus on the receiving side. Thereby, even in the receiver in which equalization and the error correction are simultaneously performed, interleaved transmission data can be demodulated.

According to the present invention, there can be provided a radio communication apparatus on the transmitting side for transmitting transmission data, which is frequency hopped between a plurality of frequencies, to the radio communication apparatus on the receiving side. Thereby, interleave effect can be fully exerted even at a slow speed fading time.

According to the present invention, there can be provided a radio communication apparatus on the transmitting side for transmitting modulation data, which is encoded using an impartible (predetermined) code after adding a CRC bit to transmission data, to the radio communication apparatus on the receiving side. Thereby, when the unit for adding the CRC bit is set as a data frame, the frame error rate of the data frame can be reduced.

In the present invention, there is provided a base station apparatus comprising a receiving system, in which equalization for compensating for distortion caused by multipath fading and an error correction for decoding data error-correction encoded are simultaneously performed, for performing data transmission between a mobile station moving in a cell and the base station. Thereby, the error rate characteristic in the base station can be improved.

In the present invention, there is provided a mobile station apparatus comprising a receiving system, in which equalization for compensating for distortion caused by multipath fading and an error correction for decoding data error-correction encoded are simultaneously performed, for performing data transmission between a base station provided in a cell and the mobile station. Thereby, the error rate characteristic in the mobile station can be improved.

The embodiments of the present invention will now be specifically described with reference to the drawings.

(First Embodiment)

Figure 5:
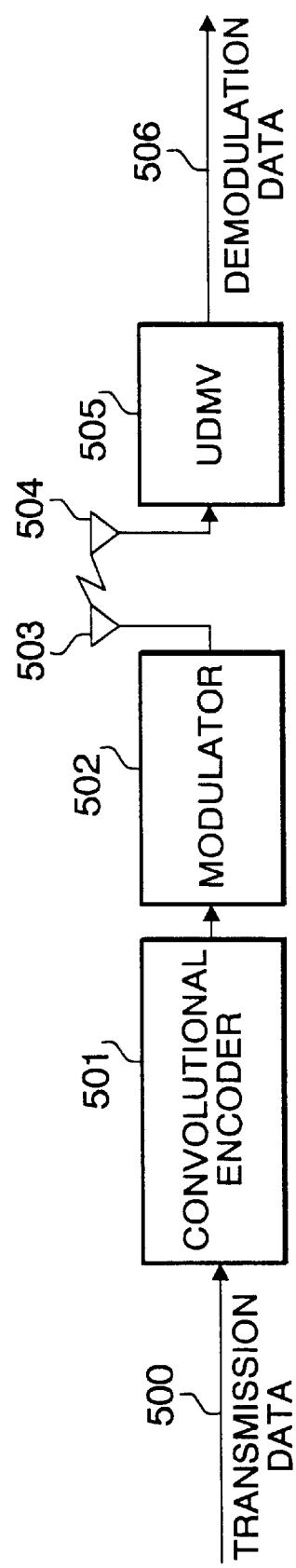
FIG. 5 is a diagrammatic view of a data transmitter of a first embodiment of the present invention.

FIG. 5 is a diagrammatic view of a data transmitter of the first embodiment of the present invention.

According to the data transmitter of this embodiment, in the transmitting system, transmission data 500 is encoded by a convolutional encoder 501 and is modulated by a modulator 502, and is transmitted from a transmitting antenna 503. In the receiving system, a received signal received by a receiving antenna 504 is input to an UDMV (United Decoder with MLSE and Viterbi decoder) 505 through a detector. Then, compensation for distortion caused by multipath fading is performed simultaneously with the error correction by Viterbi encoding, thereby obtaining demodulation data 506. The UDMV 505 is a demodulator in which the MLSE and the Viterbi decoder are combined.

Figure 6:
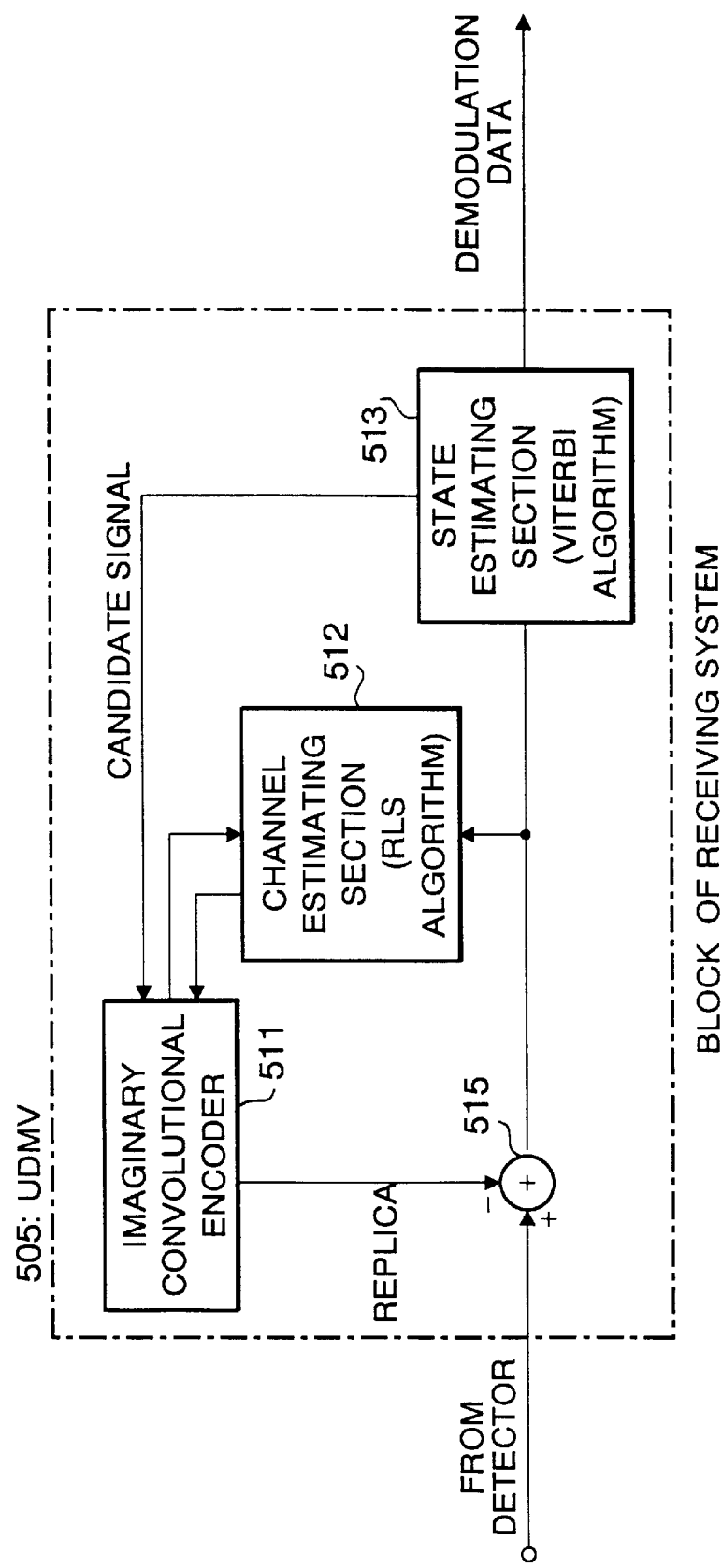
FIG. 6 is a diagram showing the function block of an UDMV in a receiving system of the first embodiment of the present invention.

FIG. 6 shows the function block of the UDMV 505. An imaginary convolutional encoder 511 is a digital filter, which is structured to have a state in which the convolutional encoder 501 of the transmitting system and the line distortion are combined. The convolutional encoder 511 will be specifically described later. A channel estimating section 512 estimates a complex gain coefficient to reproduce a transmission wave propagation path using a unique word inserted into the received signal, and sets the estimated coefficient to the convolutional encoder 511. A state estimating section 513 inputs a candidate signal corresponding to the bit number of the transmission signal to the convolutional encoder 511 through a modulator 514 for adding the same modulation as the case of the transmitting system. Also, the state estimating section 513 fetches an error signal, which shows an error between a replica from the imaginary convolutional encoder 511 and a real received signal, from an adder 515 and selects a path to be connected to the candidate having a small error. Then, the state estimating section 513 outputs a data row connected at the selected path as demodulation data.

Figure 7:
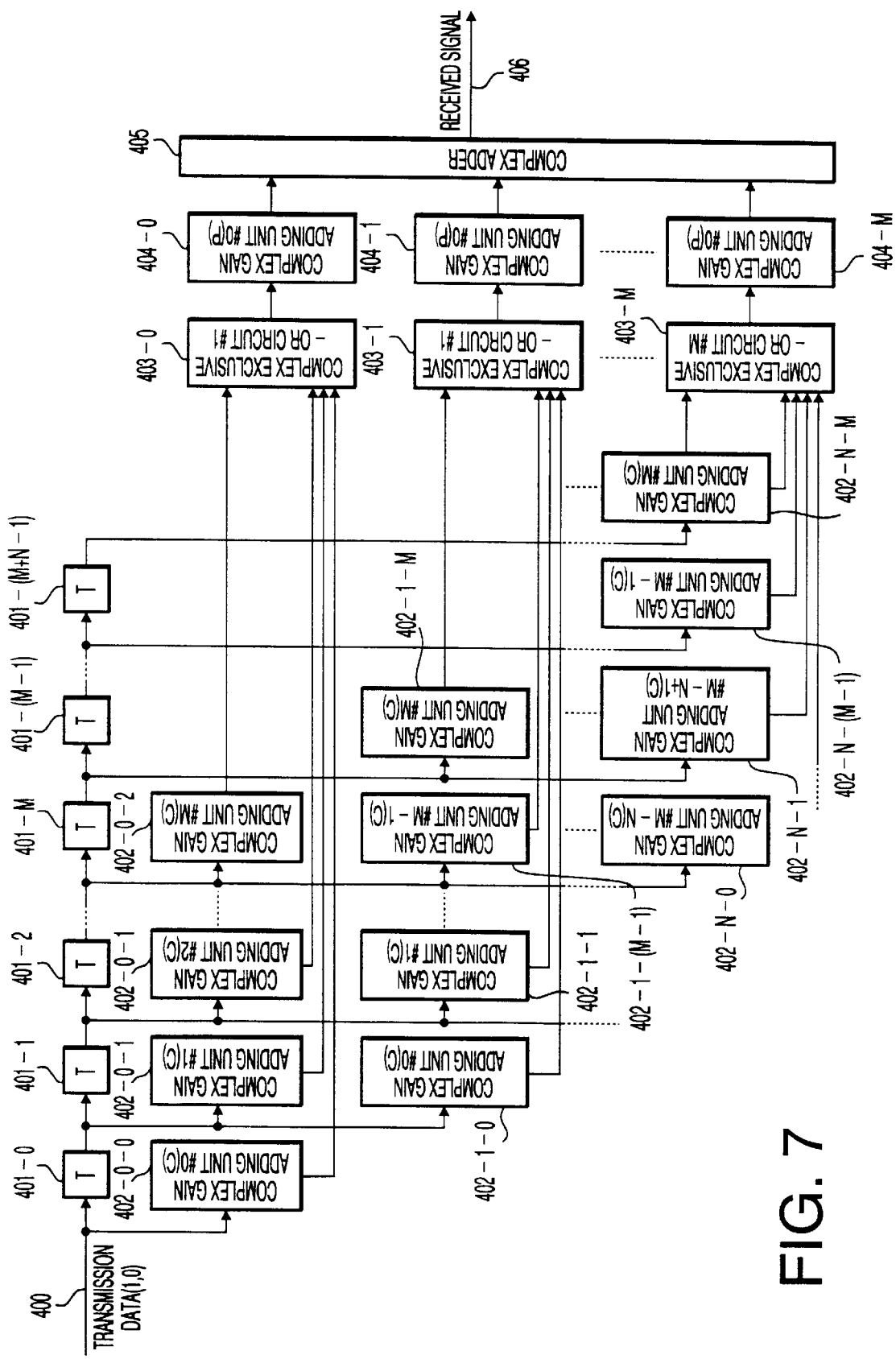
FIG. 7 is a diagram showing the function block of an imaginary convolutional decoder provided in the UDMV.

FIG. 7 shows the structure of the imaginary convolutional encoder 511 when the encoding rate is 1/2 and a QPSK modulation is used. The imaginary convolutional encoder 511 as shown in the figure comprises a delay unit row having (M+N) delay units 401-0 to 401-(M+N-1) connected in series, complex gain blocks of (N+1) corresponding to the number of waves of the line, complex exclusive-OR circuits 403-0 to 403-N provided to correspond to the respective complex gain blocks, complex gain circuits 404-0 to 404-N, which multiply an output of each of the complex exclusive-OR circuits 403-0 to 403-N by a gain for compensating for the line distortion, and a complex adder 405 for adding the outputs of the respective complex gain circuits 404-0 to 404-N.

The complex gain blocks comprise complex gain adding units (402-0-0 to 402-0-M), (402-L-0 to 402-1-M), . . . (402-N-0 to 402-N-M), respectively. The number of complex gain adding units corresponds to the constraint length of the convolutional encoder 501.

Delay data of the delay units 401-0 to 401-(M-1) in the delay unit row is sequentially input in parallel to the complex gain adding units 402-0 to 402-0-M, which form the complex gain block of the uppermost stage, in order. The complex exclusive-OR of the outputs of these complex gain adding units 402-0-0 to 402-0-M is calculated by the complex exclusive-OR unit 403-0.

Figure 3:
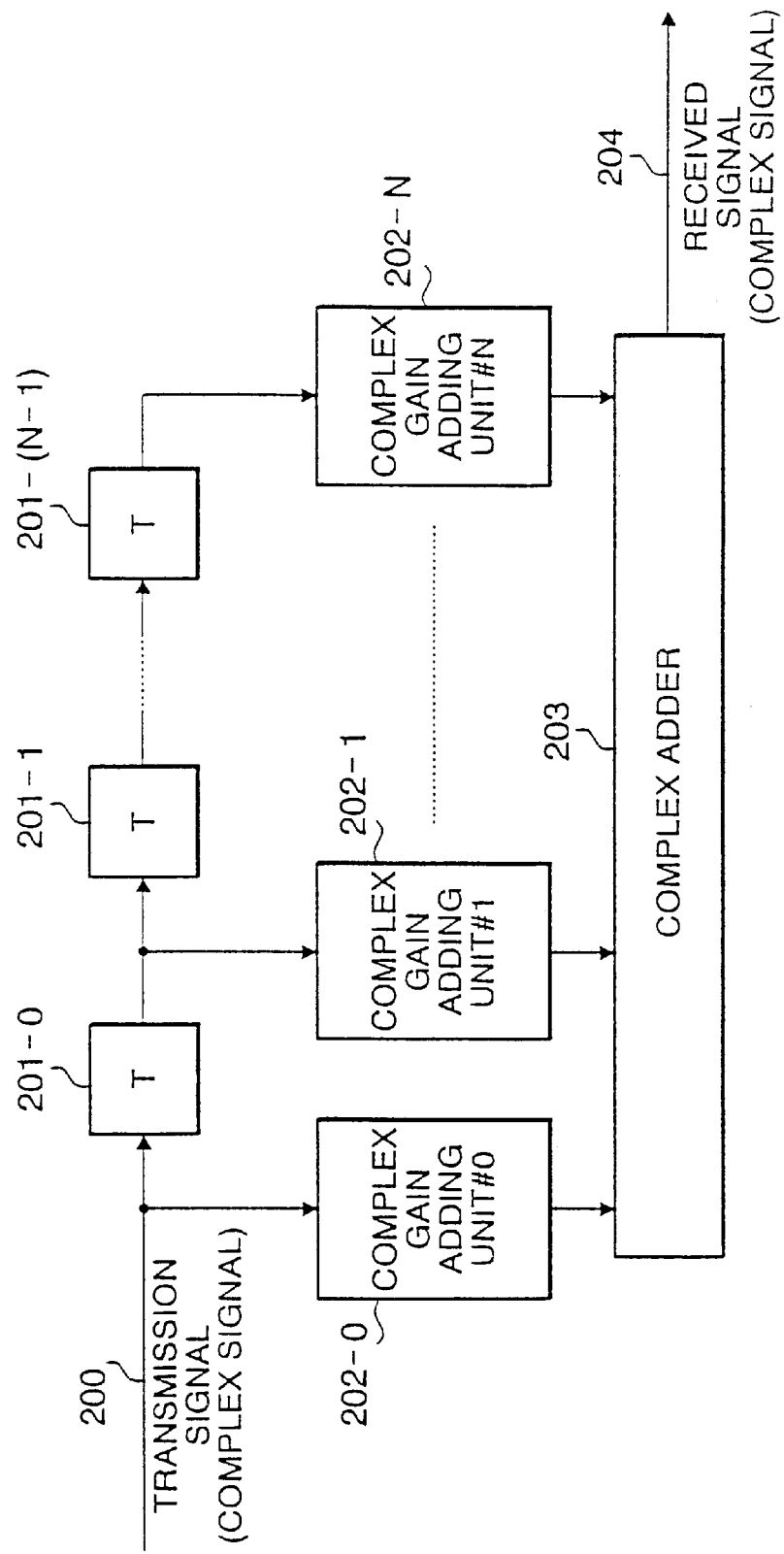
FIG. 3 is a structural view of a filter in which a line model is rewritten to a form close to a digital filter.
Figure 4:
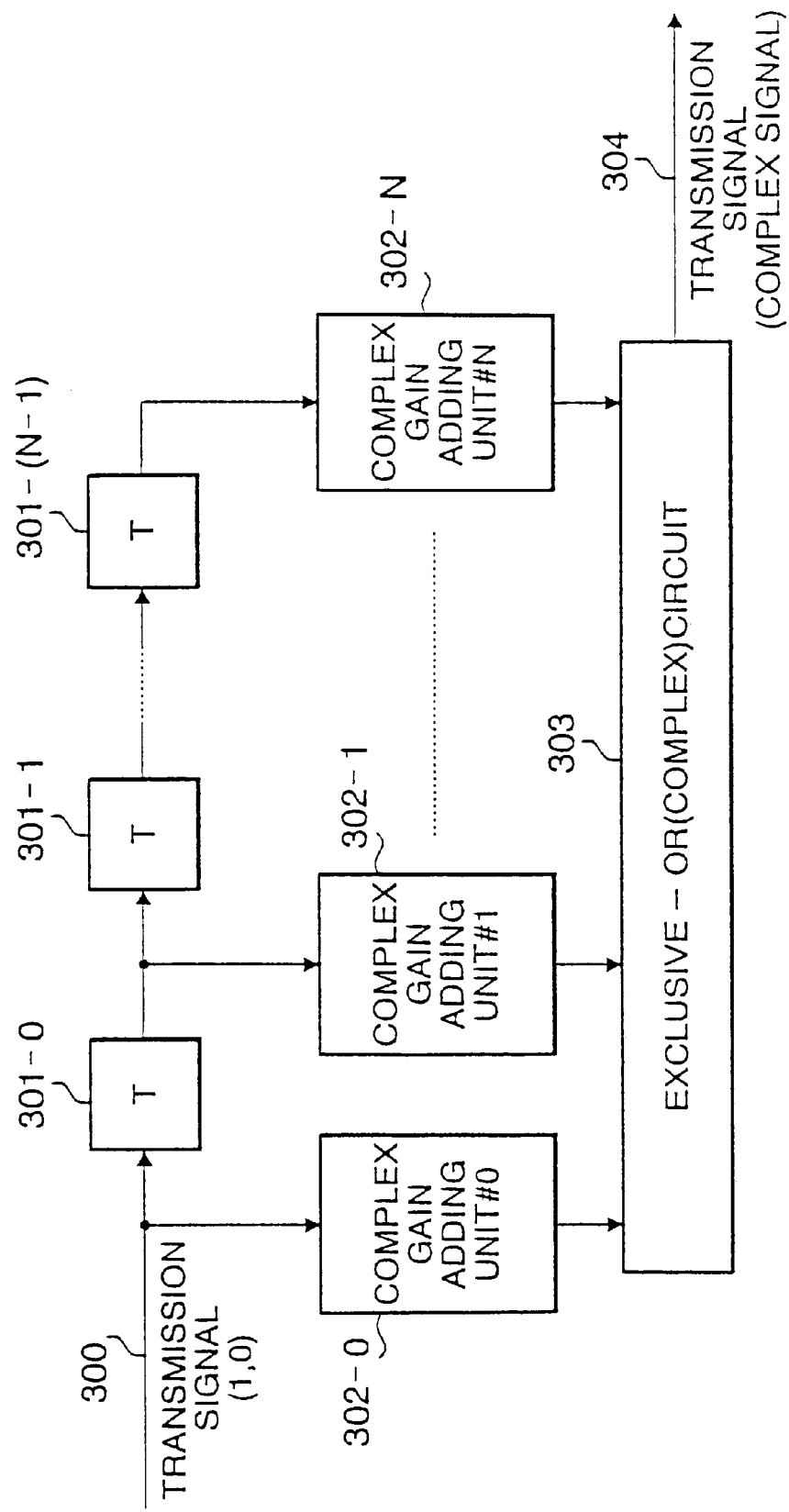
FIG. 4 is a structural view of an encoder.

That is, in the imaginary convolutional encoder 511, the delay units 401-0 to 401-(M-1), the complex gain adding units 402-0-0 to 402-0-M, and the complex exclusive-OR unit 403-0 are formed to have the same filter structure as the case of the convolutional encoder shown in FIG. 4. In the case of the convolutional encoder 501 of the transmitting system, the constraint length and the complex gain are fixed in advance. Accordingly, the number of delay per one complex gain block, and complex gain (c) of each of the complex gain adding units 402-0-0 to 402-0-M can be determined. In the case of the imaginary convolutional encoder 511, the delay data group inputting to each complex gain block is shifted one delay by one based on a block unit from the block of the uppermost stage to that of the lowest stage. Each delay due to the delay units 401-0 to 401-N is regarded as delay of each propagation path corresponding to the number of waves (N+1). Thereby, the delay units 401-0 to 401-N, the complex gain adding units 404-0 to 404-N, and the complex adder 405 are formed to have the same filter structure as the case of the digital filter to compensate for the line distortion as shown in FIG. 3. In the UDMV 505, the channel estimating section 512 estimates a filter coefficient for compensating distortion in accordance with the state of each of the current propagation path based on the unique word. Then, a complex gain (p) of each of the complex gain adding units 404-0 to 404-N of the imaginary convolutional encoder 511 is determined. The following will explain an operation of the above-structured data transmitter.

First of all, in the transmitting system, the convolutional encoder 501 provides error correction and encoding to transmission data 500. As a result, every time when one bit of transmission data 500 is input, the convolutional encoder 501 produces a several-bit sequence. The sequence is demodulated by the demodulator 502, and the resultant is transmitted from the transmitting antenna 503. In the receiving system, the receiving antenna 504 receives the signal to which the line distortion is added. The received signal is demodulated by the UDMV 505, so that demodulated data 506 can be obtained.

Next, an operation of the UDMV 505 will be explained.

The UDMV 505 waits for the state in which the convolutional encoder 501 on the transmitting side and the line distortion are combined, and performs equalization using the MLSE and the error correction using the Viterbi decoding simultaneously.

In the UDMV 505, the candidate signal supplied from the state estimating section 513 is input to the delay unit 401-0 of the first stage of the delay unit row as transmission data 400 through the demodulator 514. Thereafter, the candidate signal is sequentially delayed by the delay units 401-0 to 401-(M+N-1). On the other hand, the outputs of the delay units 401-0 to 401-(M+N-1) are multiplied by the complex gain (c) by the complex gain adding units 402-0-0 to 402-N-M, respectively. Thereafter, exclusive-OR of each of the real and imaginary parts is obtained by the complex exclusive-OR circuits 403-0 to 403-N. The complex gain adding units 402-0-0 to 402-N-M correspond to the complex gain adding units 302-0 to 302-M, respectively, and obtain any one of 0, 1, and (j+1). If we assume an arbitrary integer between 0 to N is X and an arbitrary integer between 0 to M is Y, 402-X-Y=302-Y. The complex exclusive-OR circuits 403-0 to 403-N perform the following calculations with respect to the outputs of the complex gain adding units 402-0-0 to 402-N-M.

403-0: complex exclusive-OR of outputs of the complex gain adding units 402-0-0 to 402-0-M;

403-1: complex exclusive-OR of outputs of the complex gain adding units 402-0-1 to 402-1-M;

403-N: complex exclusive-OR of outputs of the complex gain adding units 402-N-0 to 402-N-M. The outputs of the complex exclusive-OR circuits 403-0 to 403-N are multiplied by the complex gain (p) by the complex gain adding units 404-0 to 404-N, respectively. The complex gain adding units 404-0 to 404-N respectively correspond to the complex gain adding units 202-0 to 202-N of FIG. 3, and time-vary.

All outputs of the complex gain adding units 202-0 to 202-N are added by the complex adder 405 so as to be a received signal (replica) 406.

According to the above embodiment, in the imaginary convolutional encoder 511 of the UDMV 505, the received signal 406 is uniquely determined by the sequence using transmission data 400 stored by the delay units 401-0 to 401-(M+N−1). Due to this, if Viterbi decoding in the above sequence state, sequence of the transmission data 400 can be estimated. In other words, equalization and the error correction can be simultaneously performed. This can present the same effect as the case that the constraint length becomes longer when there is a delay wave. As compared with the case in which equalization and the error correction are independently performed, the error correction ability can be improved. Moreover, the number of times of trace back and the memory capacity can be reduced.

The above first embodiment shows the case in which the encoding rate is 1/2 and the QPSK modulation is used. However, the imaginary encoder can be constructed even in the other cases.

(Second Embodiment)

Figure 8:
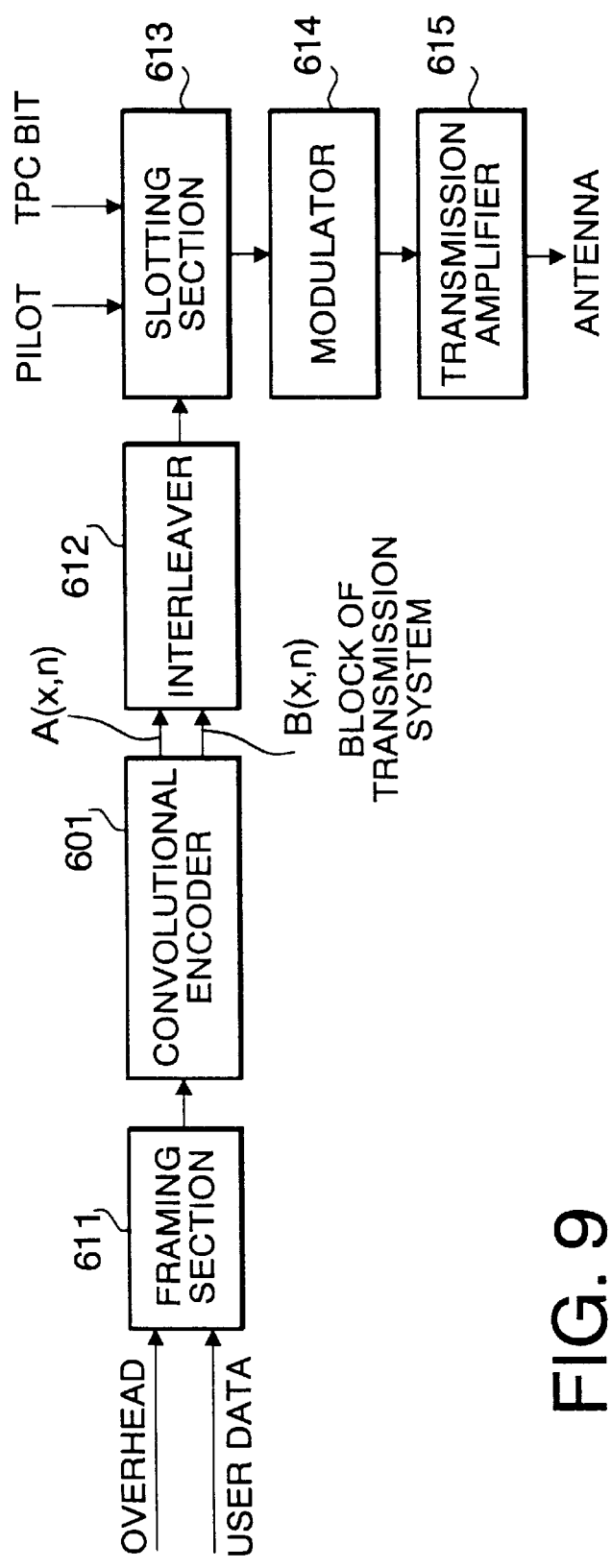
FIG. 8 is a diagram showing the function block in a transmitting system of a data transmitter of a second embodiment of the present invention.

FIG. 8 shows the structure of the function block of the transmitting system in the data transmitter according to the second embodiment of the present invention. The function block in the receiving system is structured by the UDMV similar to the first embodiment.

A framing section 611 frames user data. A convolutional encoder 601 error-correction encodes frame data, and produces a transmission sequence whose number corresponds to the encode rate. An interleaver 612 provides interleave to rearrange the order of the sequences, which are encoded, and to control such that data are allocated to the slots for every transmission sequence. A slotting section 613 slots the interleaved transmission sequence, and sets a pilot symbol, and a transmission power control bit (TPC). The transmission sequence is inserted into the slot, modulated by a modulator 614, and transmitted from the antenna through a transmission amplifier 615.

Figure 9:
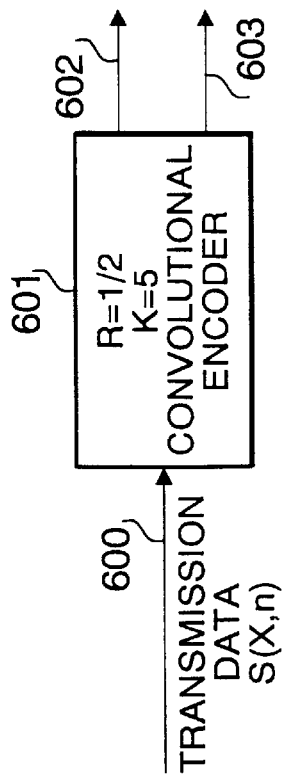
FIG. 9 is an input/output view of the a convolutional encoder of the transmitting system of the second embodiment of the present invention.

FIG. 9 shows the setting of the convolutional encoder 601. In this case, the encoding rate is 1/2, and error-correction encoded data is divided to two sequences, i.e., transmission sequences (A) 602 and (B) 603. In the case of a different encoding rate, the number of sequences is increased in accordance with a denominator of the encoding rate.

Next, the following will explain an operation of the above-structured embodiment.

The framed transmission data 600 is error-correction encoded by the convolutional encoder 601, and divided into two sequences, i.e., transmission sequences (A) 602 and (B) 603 to be sent to the interleaver 612.

In this embodiment, since the number of sequences is two in accordance with the encoding rate 1/2, the interleaving is provided to the reciprocal of the encoding rate 1/2, that is, two slots. The transmission sequence (A) 602 is allocated to an even slot number as a first slot in one transmission, and the transmission sequence (B) is allocated to an odd slot number as a second slot in one transmission. When the encoding rate is expanded to 1/N, one transmission sequence is divided into first to Nth slot in accordance with N of the reciprocal of the encoding rate, a plurality of transmission sequences are allocated to different slots, respectively. Also, data of the different sequence is not allocated to one slot.

FIG. 10 shows the specific example in which the slot is interleaved in a random fashion by the interleaver 612. Reference numeral 604 is a signal of slot #0, 605: a signal of slot #1, 606: a signal of slot #2, and 607: a signal of a slot #3. These different transmission sequences A 602 and B603 are allocated to the different slots in order to produce interleaving effect as maintaining the order of the sequences.

FIG. 10 is an example in which transmission data 600 is set as data frame every six bits. It is assumed that Z is 0 to 5. The first to the sixth bits are expressed as S (0, Z), and the next six bits are expressed as S (1, Z) . . . Also, it is assumed that an arbitrary integer is X. The transmission sequence A602 generated to S (X, Z) is expressed as A (X, Z). The transmission sequence B603 generated to S (X, Z) is expressed as B (X, Z). A (0, Z), A (1, Z), B (0, Z), and B (1, Z) are allocated to slots #0 (604), #2 (606), #1 (605), and #3 (607), respectively. In this case, a time interval is provided between the slots to lessen a correlation between fading.

On the other hand, in the receiving system, at the time when the slots #0 (604) and #1 (605) are received, S (0, Z) is estimated, and at time when the slots #2 (606) and #3 (607) are received, S (1, Z) are estimated. Thus, the estimation is performed, and data is modulated.

According to the above embodiment, the receiving system comprises the UDMV in which equalization and the error correction are simultaneously performed by estimating the imaginary encoder having the combination of the convolutional encoder of the transmitting system and the line. Due to this, interleave cannot be introduced by simply rearranging the order of the encoded sequence. In order to produce the interleaving effect as maintaining the order of the sequence, these different transmission sequences are allocated to the different slots.

Accordingly, even in the case in which the UDMV is used, interleave can be introduced, and the error correction effect can be improved.

(Third Embodiment)

This embodiment shows a case in which the slot interleaved in a random fashion by the interleaver similar to the case of the second embodiment is frequency hopped between a plurality of frequencies to transmit data.

FIG. 11 shows an example of frequency hopping according to this embodiment. This figure shows a case in which four frequencies are used and four users perform data transmission. Reference numeral 700 is a signal of frequency f1, 701: a signal of frequency f2, 702: a signal of frequency f3, and 703: a signal of frequency f4. In this case, f1 to f4 are frequencies different from one another. Each block shows one slot.

It is assumed that attention is paid to a certain user 1. The frequency hopping is performed as shown by mesh portions in the figure. The user 1 executes data transmission using frequencies of f1, f2, f4, f3, f1, f3, f4, f3, f2 for each slot.

According to the above-mentioned embodiment, the correlation between fading becomes small when the frequency differs. Even if no long time interval is provided between the slots, the fading between adjacent slots can be independently set. Therefore, sufficient interleaving effect can be obtained with respect to the slow-speed fading.

(Fourth Embodiment)

Figure 12:
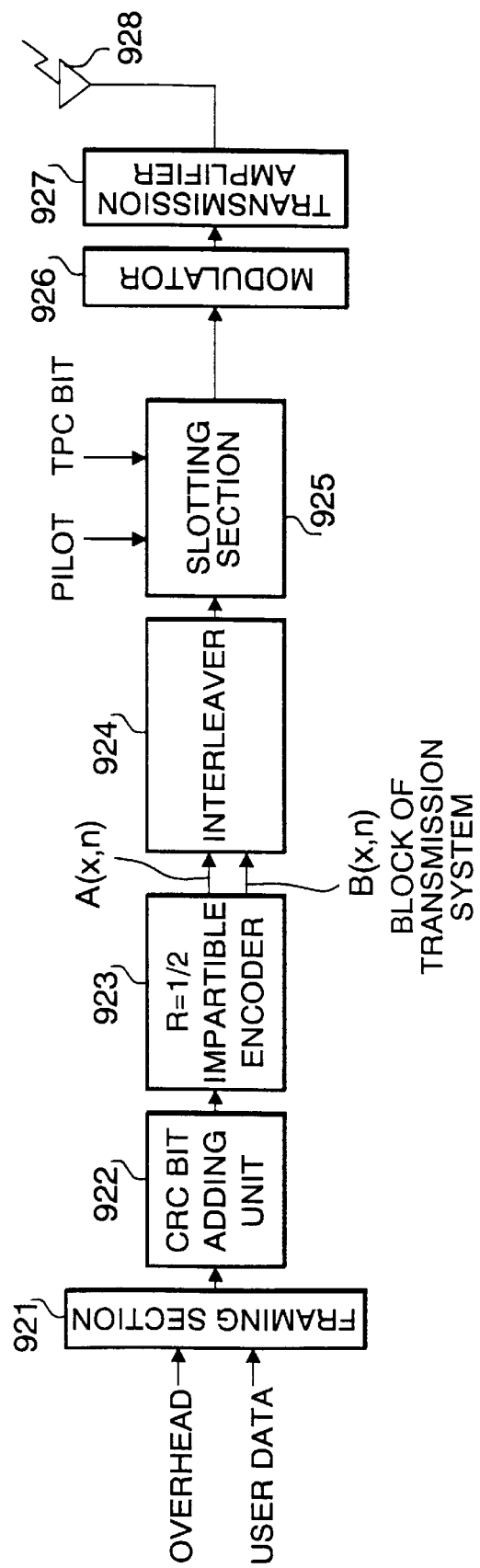
FIG. 12 is a diagram showing the function block in the transmitting system of the data transmitter of a fourth embodiment of the present invention.
Figure 13:
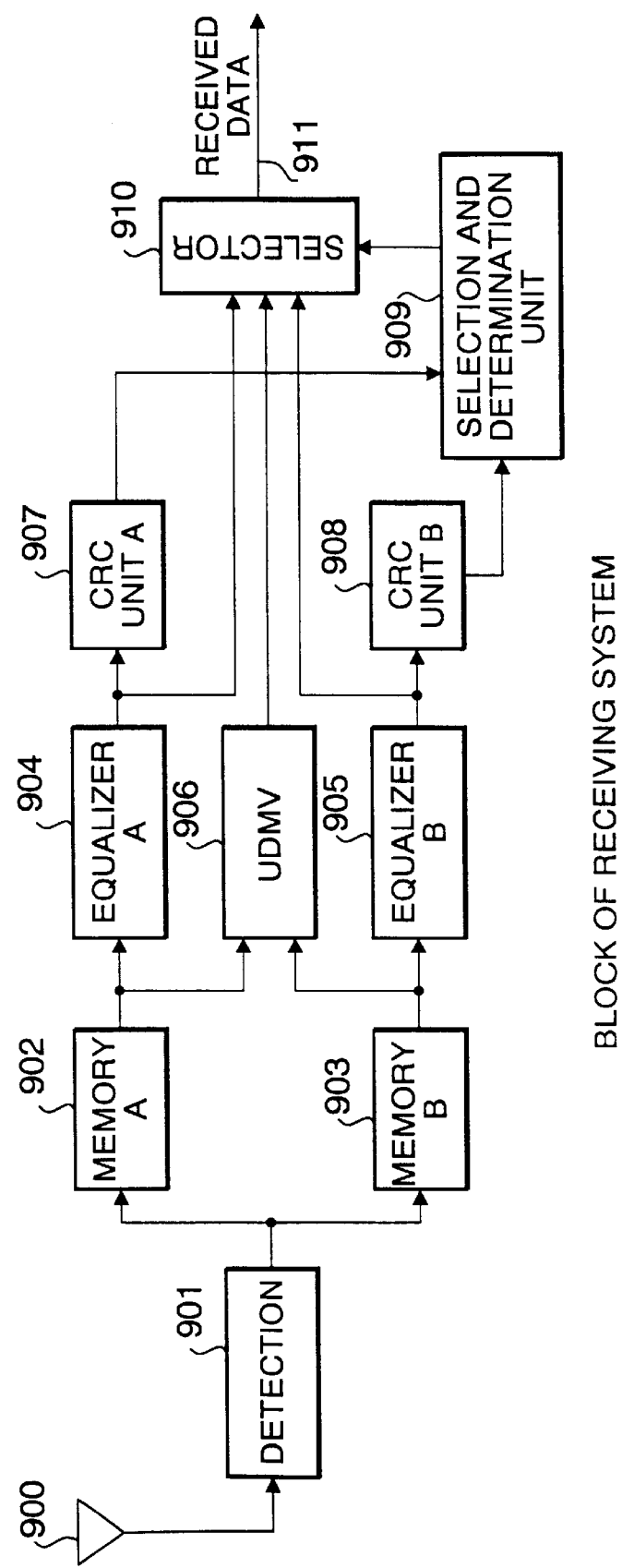
FIG. 13 a diagram showing the function block in the receiving system of the data transmitter of the fourth embodiment of the present invention.

FIG. 12 shows the structure of the function block in the transmitting system of the data transmitter according to the fourth embodiment, and FIG. 13 shows the structure of the function block in the receiving system. The transmitting system comprises a framing section 921 for framing transmission data, a CRC bit adding unit 922 for adding check bit to the frame data, an impartible encoder 923, an interleaver 924, a slotting section 925, a modulator 926, a transmitting amplifier 927, and an antenna 928.

The receiving system comprises an antenna 900, a detector 901, a memory A902, a memory B903, an equalizer A904, an equalizer B905, an UDMV 906, a CRC unit A907, a CRC unit B908, a selection and determination unit 909, and a selector 910. Similar to the case of UDMV 505 explained in the first embodiment, the UDMV 906 is the combination of the equalizer and the error corrector. The selection and determination unit 909 fetches the check result of the CRC units A907 and B908, and provides instruction of selection data to the selector 910 based on Table shown in FIG. 14.

An operation of the above-structured data transmitter will be explained.

In the transmitting system, the CRC bit is added to transmission data 800 by a CRC bit-adding unit 801. Thereby, it can be checked whether or not there is an error in received data. Next, impartible encoding is provided by an impartible encoder 802 to form a transmission sequence (A) 803 and a transmission sequence (B) 804.

An impartible code is one that can decode transmission data 800 if either the transmission sequence (A) 803 or transmission sequence (B) 804 is obtained. Moreover, the impartible code is one that can perform the error correction if both transmission sequences (A) 803 and (B) 804 are obtained. Since the structure of the impartible encoder 802 is the same as that of the convolutional encoder, the UDMV 906 of the receiving system may have the same structure as the case of the first embodiment.

Then, the same interleaving as in the second embodiment is provided to these impartible-encoded transmission sequences (A) 803 and (B) 804, and the interleaved sequences are slotted by the slotting section 925.

FIG. 15 shows the specific example of the slot to which the interleaving is provided.

In the transmission of transmission data S (0, n), data of the transmission sequence A is inserted to a signal 805 of the slot #0 as the first slot, and data of the transmission sequence B is inserted to a signal 806 of the slot #1 as the second slot.

In the transmission of transmission data S (1, n), data of the transmission sequence A is inserted to a signal 807 of the slot #2 as the first slot, and data of the transmission sequence B is inserted to a signal 808 of the slot #3 as the second slot.

In the receiving system, the detector 901 detects the signal received by the receiving antenna 900, and the even slot stores the detected signal in the memory A902, the odd slot stores the detected signal in the memory B903. The equalizer A904 equalizes the signal stored in the memory A902, and the CRC unit A907 checks whether or not there is an error in the resultant. The equalizer B905 equalizes the signal stored in the memory B903, and the CRC unit B908 checks whether or not there is an error in the resultant. Moreover, both the signal stored in the memory A902 and the signal stored in the memory B903 are used to be demodulated by the UDMV 906.

In the selection and determination unit 909, the most proper output is selected from the outputs of the equalizer A904, the equalizer B905, and the UDMV 906 by the selector 901 based on the results of the CRC units, using a selection logic Table of FIG. 14. Then, the selected output is used as received data 911.

For example, when the quality of the signal stored in the memory A902 is extremely good and that of the signal stored in the memory B903 is extremely poor, the result of the CRC unit A907 is OK, and that of the CRC unit B908 is not good. When the quality of the signal stored in the memory B903 is extremely poor, the error may stay in the output of the UDMV 906 by influence of the memory B903. In such a case, the output of the equalizer A904 is selected as a proper output.

When both results of the CRC units A907 and B908 are not good, the quality of the UDMV 906 is expected to be best by the error correction, and the output of the UDMV 906 is selected.

When both results of the CRC units A907 and B908 are good, the output of any one of equalizers A and B may be selected at an arbitrary setting since both equalizers A904 and B905 have good output quality.

According to the above-explained embodiment, even in a case where the signal quality of one transmission sequence is extremely poor, modulating data, which is expected to have the best quality, can be obtained without being influenced by the signal with the poor quality. When the unit for adding the CRC bit is used as a data frame, the reduction in the frame error rate of particularly the data frame can be improved.

The data transmitter of each of the embodiments can be applied to a cellar system. The UDMV, which corresponds to the encoder used in the data transmitter of the base station, is mounted on the mobile station freely moving in the cell. Also, the UDMV, which corresponds to the encoder used in the data transmitter of the mobile station, is mounted on the base station. The same data transmission in the transmitting and receiving systems of the above-mentioned data transmitter is executed between the base station and the mobile station, allowing the improvement of the transmission quality.

The above embodiments explained the case in which the frame data is slotted to transmit data. However, the present invention is not limited to the above case together with the encoding, interleaving, and the frequency hopping.

As described above, according to the present invention, equalization to remove the line distortion caused by multipath fading and the error correction to improve the reduction in the error rate can be simultaneously performed. Thereby, there can be obtained an useful advantage in which the receiving quality can be improved. Moreover, since two steps of equalization and the error correction can be performed at one time, there can be obtained useful advantages in which the number of times of trace back and the reduction in the memory capacity can be improved.

What is claimed is:

1. A radio communication device, comprising:
   a receiving system having an equalizing system integrated with an error correcting system, wherein said equalizing system compensates for an estimated distortion caused by a multipath fading and said error correcting system, comprising a united decoder (UDMV), decodes encoded error-correction data.

2. The radio communication device of claim 1, further comprising:
   a demodulator that combines said equalizing system and said error correcting system, said united decoder (UDMV) comprising a maximum likelihood sequence estimator (MLSE) and a Viterbi decoder.

3. The radio communication device of claim 2, wherein said demodulator comprises an imaginary encoder, in which a multipath leading to an antenna of said receiving system from an encoder associated with a transmitter is imaginarily structured by a digital filter.

4. The radio communication device of claim 3, further comprising:
   a decoder that sets a state in which an output of said encoder associated with said transmitter and a line distortion signal are combined in said imaginary encoder; and
   a sending device that sends a candidate signal to said imaginary encoder, while estimating a transmission data sequence from an error signal obtained from a replica output of said imaginary encoder and a received signal from said transmitter.

5. The radio communication device of claim 1, further comprising:
a plurality of equalizers that equalize received data for each transmission sequence of a plurality of transmission sequences;
a Cyclic Redundancy Checking (CRC) device that cyclic redundancy checks demodulated data decoded by said plurality of equalizers; and
a selector that selects demodulated data from the receiving system that fails a cyclic redundancy check.

6. The radio communication device of claim 1, further comprising a transmitter that maintains a sequence order of transmitted data that is interleaved with a depth corresponding to a reciprocal of an encoding rate.

7. The radio communication device of claim 1, further comprising a transmitter that frequency hops transmitted data between a plurality of frequencies.

8. The radio communication device of claim 1, further comprising an encoder that encodes data transmitted by a transmitter with an impartible code after a cyclic redundancy check (CRC) bit has been added.

9. A method of radio communication, comprising:
receiving modulation data provided with an interleave with a depth corresponding to a reciprocal of an encoding rate in order to maintain a sequence order on a transmitting side; and
performing an equalization to compensate for a distortion caused by a multipath fading simultaneously with an error correction with respect to a modulation data corresponding to a plurality of transmitting sequences when transmission data is encoded on the transmitting side
said performing an equalization simultaneously with an error correction being performed as a single, integrated step.

10. The method of radio communication as recited in claim 9, further comprising:
sharing at least one delay unit performing the equalization and the error correction.

11. A method of radio communication, comprising:
receiving modulation data that is frequency hopped between a plurality of frequencies; and performing an equalization operation to compensate for a distortion caused by a multipath fading simultaneous with an error correction performed with respect to modulation data that is extracted from a predetermined transmitter in synchronism with a frequency hopping operation,
said performing an equalization operation simultaneously with an error correction being performed as a single, integrated step.

12. The method of radio communication as in claim 11, further, comprising:
sharing at least one delay unit in performing the equalization operation and the error correction operation.

13. A base station of a radio communication device, comprising:
a receiver, comprising:
an equalizing system that compensates for a distortion resulting from multipath fading; and
an error correcting system, comprising a united decoder (UDMV), that decodes an encoded error-correction data, wherein data decoding and distortion compensation are simultaneously performed as a single, integrated step; and
wherein said base station performs a data transmission with a mobile station that is capable of moving among a plurality of cells.

14. The base station of a radio communication device as in claim 13, further comprising:
at least one delay unit that is shared in performing the data decoding and the distortion compensation.

15. A mobile station of a radio communication device, comprising:
a receiver, comprising:
an equalizing system that compensates for a distortion resulting from multipath fading; and
an error correcting system, comprising a united decoder (UDMV), that decodes an encoded error-correction data, wherein data decoding and distortion compensation are simultaneously performed as a single, integrated step; and
wherein said mobile station performs a data transmission with a base station located in a predetermined cell.

16. The mobile station of a radio communication device as in claim 15, further comprising:
at least one delay unit that is shared in performing the data decoding and the distortion compensation.

17. A radio communication apparatus comprising:
a receiver that receives a radio signal; and a demodulator that simultaneously performs equalization and error correction on the radio signal as a single, integrated step to obtain a received signal,
wherein in the demodulator, at least one delay unit is shared in performing the equalization and the error correction.

18. A radio communication apparatus as set forth in claim 17, further comprising:
a united decoder with an imaginary convolutional encoder, said imaginary convolutional encoder comprising a plurality of delay units.

19. A radio communication apparatus as set forth in claim 18, further comprising:
a plurality of complex operation blocks that correct errors and compensate for line distortion.

* * * * *

UNITED STATES PATENT AND TRADEMARK OFFICE
CERTIFICATE OF CORRECTION

PATENT NO.    : 6,347,391 B1
DATED         : February 12, 2002
INVENTOR(S)   : Uesugi et al.

It is certified that error appears in the above-identified patent and that said Letters Patent is hereby corrected as shown below:

<u>Title page,</u>
Item [56], References Cited, under FOREIGN PATENT DOCUMENTS: insert
-- 2-172333    07/03/90    Japan    H04B  3/06
   3-284021    12/13/91    Japan    H03M  13/12
   4-79615     03/13/92    Japan    H03M  13/12 --

Under OTHER DOCUMENTS: insert
-- English Language Abstract of JP 2-172333
   English Language Abstract of JP 3-284021
   English Language Abstract of JP 4-79615 --

Signed and Sealed this

Twenty-fifth Day of June, 2002

*Attest:*

JAMES E. ROGAN
*Director of the United States Patent and Trademark Office*

*Attesting Officer*